US011614031B2

(12) United States Patent
Madhava et al.

(10) Patent No.: US 11,614,031 B2
(45) Date of Patent: Mar. 28, 2023

(54) MOUNTING SYSTEM FOR VIBRATION MEASUREMENT SYSTEM

(71) Applicant: Caterpillar Inc., Peoria, IL (US)

(72) Inventors: Raghunandana H Madhava, Peoria, IL (US); Ryan David Funk, Washington, IL (US); Yuanhong Guan, Peoria, IL (US); Nathan Stephen Pauli, Peoria, IL (US); Daniel Gregory Wear, East Peoria, IL (US); David Charles Hoots, Morton, IL (US); Dennis Lee Kroeger, Washington, IL (US)

(73) Assignee: Caterpillar Inc., Peoria, IL (US)

(*) Notice: Subject to any disclaimer, the term of this patent is extended or adjusted under 35 U.S.C. 154(b) by 121 days.

(21) Appl. No.: 17/168,236

(22) Filed: Feb. 5, 2021

(65) Prior Publication Data
US 2022/0252003 A1 Aug. 11, 2022

(51) Int. Cl.
| F02B 77/08 | (2006.01) |
| G01H 1/00 | (2006.01) |
| F01D 17/02 | (2006.01) |
| G01D 11/24 | (2006.01) |

(52) U.S. Cl.
CPC .............. *F02B 77/08* (2013.01); *F01D 17/02* (2013.01); *G01D 11/245* (2013.01); *G01H 1/003* (2013.01)

(58) Field of Classification Search
CPC ....... F02B 77/08; F01D 17/02; G01D 11/245; G01H 1/003
See application file for complete search history.

(56) References Cited

U.S. PATENT DOCUMENTS

| 6,910,671 | B1* | 6/2005 | Norkus ................ B62D 24/02 248/560 |
| 9,953,627 | B2 | 4/2018 | Christoph et al. |
| 10,539,179 | B2 | 1/2020 | Campbell et al. |
| 2007/0224014 | A1* | 9/2007 | Stinson ................ F16B 13/045 411/34 |
| 2010/0148027 | A1 | 6/2010 | Lenk |
| 2019/0032710 | A1* | 1/2019 | Campbell ........... B61L 15/0081 |

FOREIGN PATENT DOCUMENTS

CN 204666248 9/2015

* cited by examiner

*Primary Examiner* — Jacob M Amick
*Assistant Examiner* — Charles J Brauch
(74) *Attorney, Agent, or Firm* — Xsensus, L.L.P.

(57) ABSTRACT

A mounting system for retrofitting a vibration sensor to a machine component is provided. The mounting system includes an elongate fastener, a washer, and a mounting boss. The elongate fastener includes a fastener head and an elongated body defining a longitudinal top end and a longitudinal bottom end. The longitudinal bottom end defines a fastening end configured to engage with a corresponding fastening receptacle of the machine component. The washer defines an external surface and includes a central cavity for engaging the elongated body of the elongate fastener therein. The mounting boss includes a first portion and a second portion. The first portion includes an internal cavity defining a first cavity section configured to engage with the external surface of the washer, and a second cavity section to engage with the fastener head of the elongate fastener. The second portion defines a receiving port for receiving the vibration sensor.

20 Claims, 3 Drawing Sheets

MOUNTING SYSTEM FOR VIBRATION MEASUREMENT SYSTEM

TECHNICAL FIELD

The present disclosure relates, in general, to a vibration measurement system for measuring vibrations in a machine component. More particularly, the present disclosure relates to a mounting system for retrofitting the vibration measurement system onto the machine component in a convenient, accurate and secure mounting technique.

BACKGROUND

Various components of a machine, such as components of a drivetrain system, may be subject to wear and tear over a period of time. A common way to monitor condition of such machine components is by measuring vibrations, using vibration sensors, occurring in such components during operations. Typically, such vibration sensors are mounted as close as possible to the intended machine component to obtain accurate measurement readings from the sensors.

One of the challenges faced in mounting such vibration sensors is the difficulty to find suitable mounting locations without disassembling the machine component. Additionally, generally, such sensors may be mounted to a desired location near the machine component by way of one or more of welding, drilling, tapping, etc. However, such mounting techniques are not desirable as they are cumbersome, inefficient, costly, and can affect the material properties, strength of the adjoining component and compromise the integrity of the machine component.

U.S. Pat. No. 10,539,179 provides a sensor device for monitoring a component. The sensor device provides a zinc alloy mounting element comprising a bracket and a bolt. The zinc alloy of the zinc alloy mounting element increases a rigidity of the mounting element, the zinc alloy having less than 5% aluminum by weight and less than 5% copper by weight. At least one sensor is coupled to the zinc alloy mounting element for mounting to the component of interest. The at least one sensor measures at least one condition parameter of the component.

SUMMARY OF THE INVENTION

In one aspect, a mounting system for retrofitting a vibration sensor to a machine component is provided. The mounting system includes an elongate fastener, a washer, and a mounting boss. The elongate fastener includes a fastener head and an elongated body defining a longitudinal top end and a longitudinal bottom end. The longitudinal bottom end defines a fastening end configured to engage with a corresponding fastening receptacle of the machine component. The washer defines an external surface and includes a central cavity for engaging the elongated body of the elongate fastener therein. The mounting boss includes a first portion and a second portion. The first portion includes an internal cavity defining a first cavity section configured to engage with the external surface of the washer, and a second cavity section to engage with the fastener head of the elongate fastener. The second portion defines a receiving port for receiving the vibration sensor.

In another aspect, a vibration measurement system is provided. The vibration measurement system is retrofittable to a machine component that has at least one threaded receptacle formed thereon. The vibration measurement system includes a vibration sensor and a mounting system for retrofitting the vibration sensor to the machine component. The vibration sensor measures vibrations in the machine component. The mounting system defines a longitudinal axis and includes an elongate fastener, a washer, and a mounting boss. The elongate fastener is disposed along the longitudinal axis and includes a fastener head and an elongated body defining a longitudinal top end and a longitudinal bottom end. The longitudinal bottom end defines a threaded end configured to engage with a threaded receptacle of the machine component. The washer defines a threaded external surface and includes a central cavity for engaging the elongated body of the elongate fastener therein. The mounting boss includes a first portion and a second portion. The first portion includes an internal cavity defining a first cavity section configured to engage with the threaded external surface of the washer, and a second cavity section to engage with the fastener head of the elongate fastener. The second portion defines a receiving port for receiving the vibration sensor.

DETAILED DESCRIPTION

Figure 1:
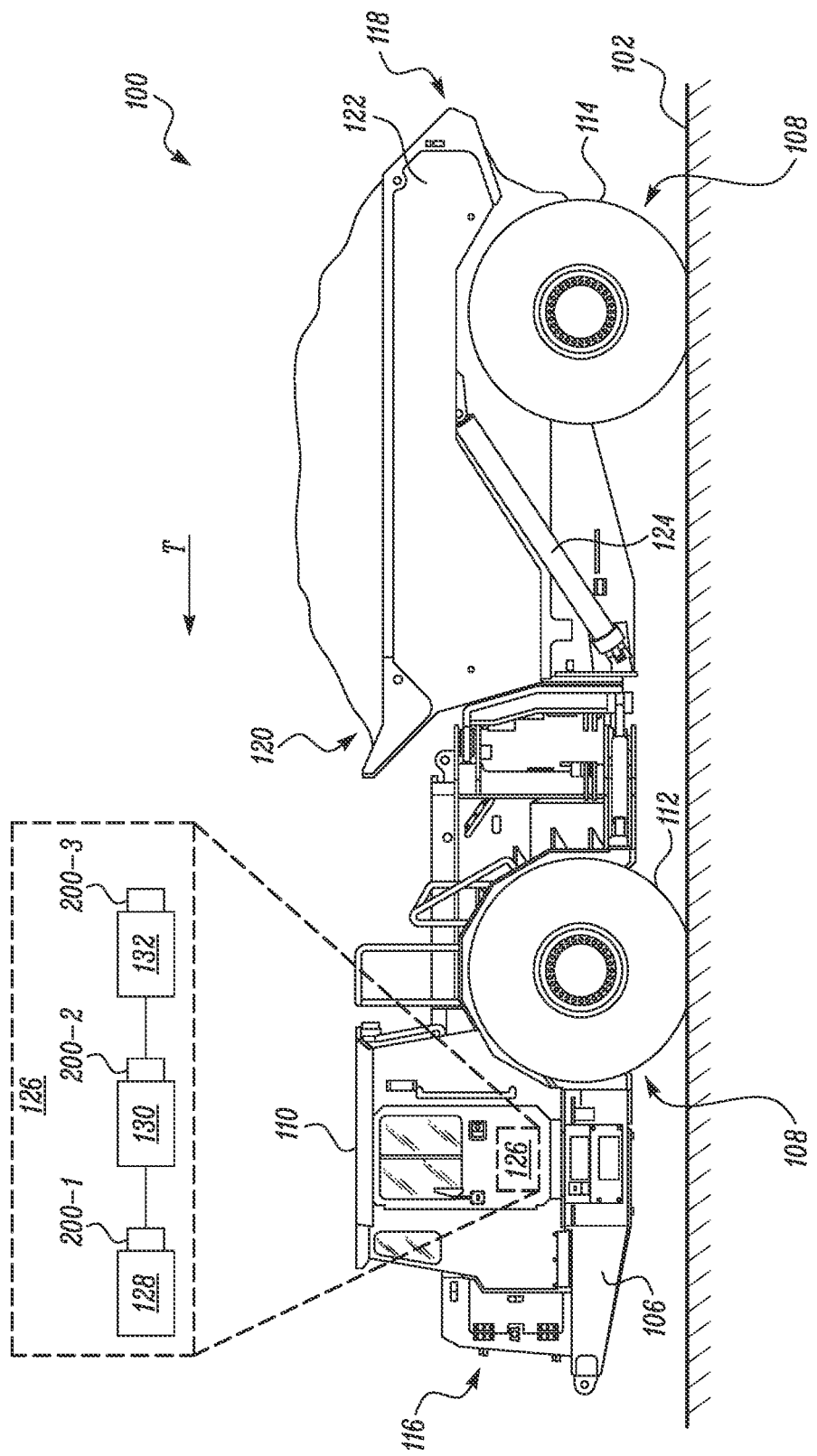
FIG. 1 illustrates an exemplary machine, according to the embodiments of the present disclosure.

The present disclosure relates to a mounting system for retrofitting a vibration measurement system onto a machine component for measuring vibrations in the machine component. To this end, FIG. 1 illustrates an exemplary machine 100 configured to operate at a worksite 102, according to the various embodiments of the present disclosure. The worksite 102 may include a mine site, a landfill, a quarry, a construction site, or any other type of worksite. In an embodiment of the present disclosure, the machine 100 may be an underground mining truck. However, it may be contemplated that the machine 100 may be any type of machine configured to perform operations associated with an industry such as mining, construction, farming, transportation, or any other industry. Other examples of the machine 100 may include, but not limited to, a dump truck, a wheel loader, a hydraulic excavator, or the like. Further, the machine 100 may be a manned machine or an unmanned machine. In some embodiments, the machine 100 may be a machine having a various level of autonomy, such as fully-autonomous machine, a semi-autonomous machine, or a remotely operated machine.

The machine 100 includes a frame 106 that supports various components of the machine 100, such as a set of ground engaging members 108 and an operator cabin 110. In an exemplary embodiment, the ground engaging members 108, as shown in FIG. 1, include a pair of front wheels 112 and a pair of rear wheels 114 (only one side shown in FIG. 1). However, in other exemplary embodiments, the ground engaging members 108 may include endless tracks for maneuvering the machine 100 at the worksite 102.

The frame 106 defines a front end 116 and a rear end 118 of the machine 100. The terms 'front' and 'rear', as used herein, are in relation to a direction of travel of the machine 100, as represented by arrow, T, in FIG. 1, with said direction of travel being exemplarily defined from the rear end 118 towards the front end 116. The rear end 118 is supported on the rear wheels 114 and supports an implement 120, which performs one or more implement operations at the worksite 102. In one example, the implement 120 may be embodied as a dump body 122. However, it may be contemplated that in other embodiments of the present disclosure, other types of implements, such as, but not limited to, bucket, ejector body, blades, scrapers, grapples, or the like may also be employed by the machine 100. Additionally, the position of the implement 120 being towards the rear end 118 of the machine 100 is exemplary and other positions of the implement 120 may also be contemplated without limiting the scope of the claimed subject matter.

The dump body 122 is a section in which a payload to be hauled, such as earth, sand, etc., is loaded. The dump body 122 is pivotally mounted to the frame 106, such that the dump body 122 may be raised or lowered, with respect to the frame 106. In the illustrated embodiment, the machine 100 may further include a number of hydraulic actuators 124 to operate the dump body 122. The hydraulic actuators 124 may be extended or retracted to raise or lower the dump body 122 to facilitate the one or more implement operations.

The operator cabin 110 may include an operator console (not shown), that may include various input-output controls for operating the machine 100 and the dump body 122. For example, the operator console may include, but not limited to, one or more of steering wheel, touch screens, display devices, joysticks, switches etc., to facilitate an operator in operating the machine 100 and the dump body 122. In one example, the operator console and/or the operator cabin 110 itself, may be provided on board the machine 100, while in other embodiments, the operator console may also be positioned remotely with respect to the machine 100 and/or the worksite 102.

In an embodiment of the present disclosure, the machine 100 further includes a mechanical drivetrain system 126 configured to operate the machine 100 and its various components, such as the ground engaging members 108, the implement 120, and so on. The drivetrain system 126 may include a power source 128 configured to provide rotational output having a speed and torque to a torque converter 130. The torque converter 130 is further configured to transfer the torque output to a transmission 132, which in turn powers the ground engaging members 108. The drivetrain system 126 is well known in the art and hence not described in greater detail here for the sake of brevity of the disclosure.

The various components of the drivetrain system 126 may be subjected to wear and tear over time and start to vibrate as the machine 100 and the drivetrain system 126 operate. In order to monitor operating conditions of these machine components, one or more vibration measurement systems 200 are retrofitted on to the machine components, that monitor the vibrations in the respective machine components. The vibrations measurement system 200 is further explained in greater detail in reference to FIGS. 2 and 3.

Figure 2:
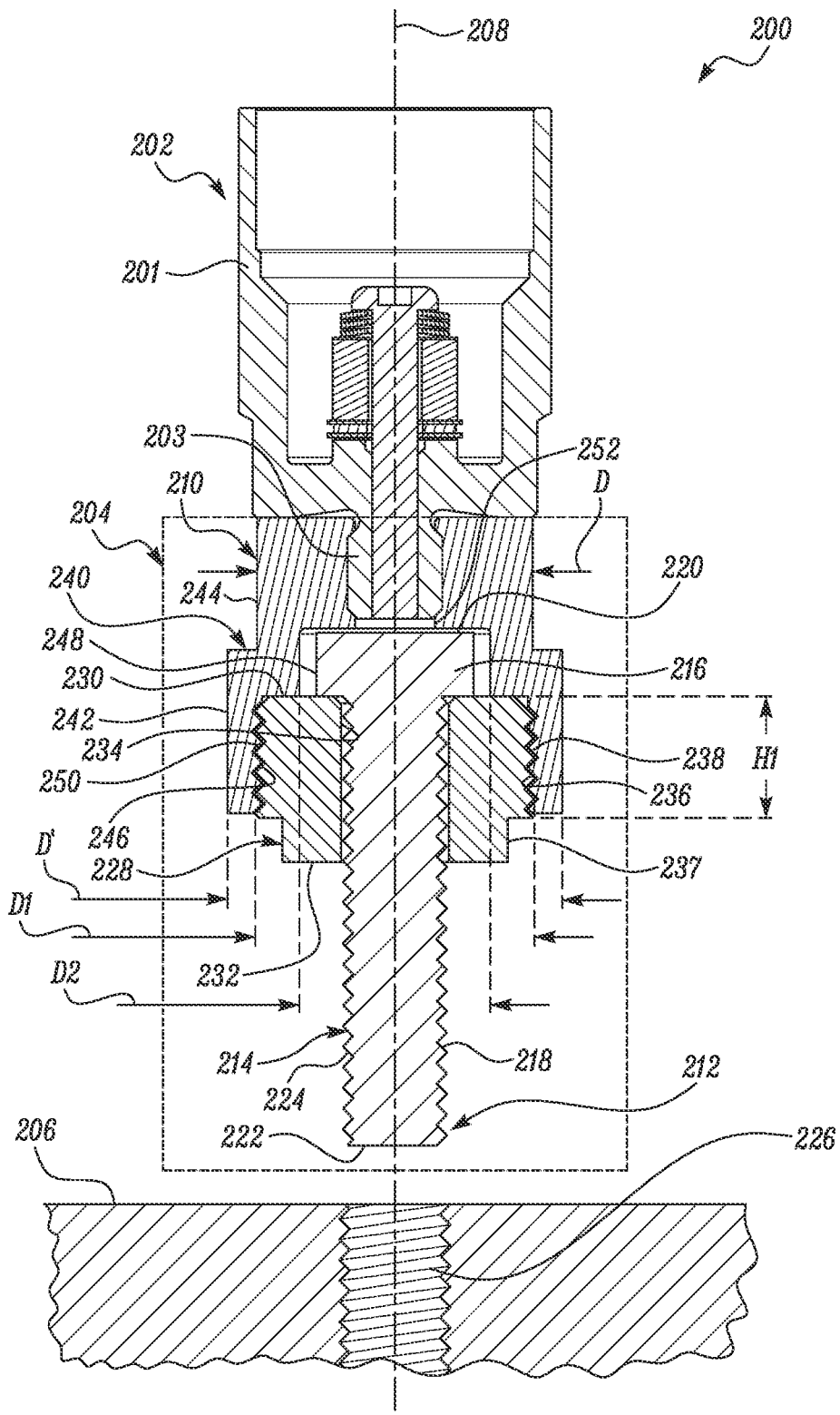
FIGS. 2 and 3 illustrate an exemplary vibration measurement system having a mounting system for retrofitting a vibration sensor onto a machine component, according to the embodiments of the present disclosure.
Figure 3:
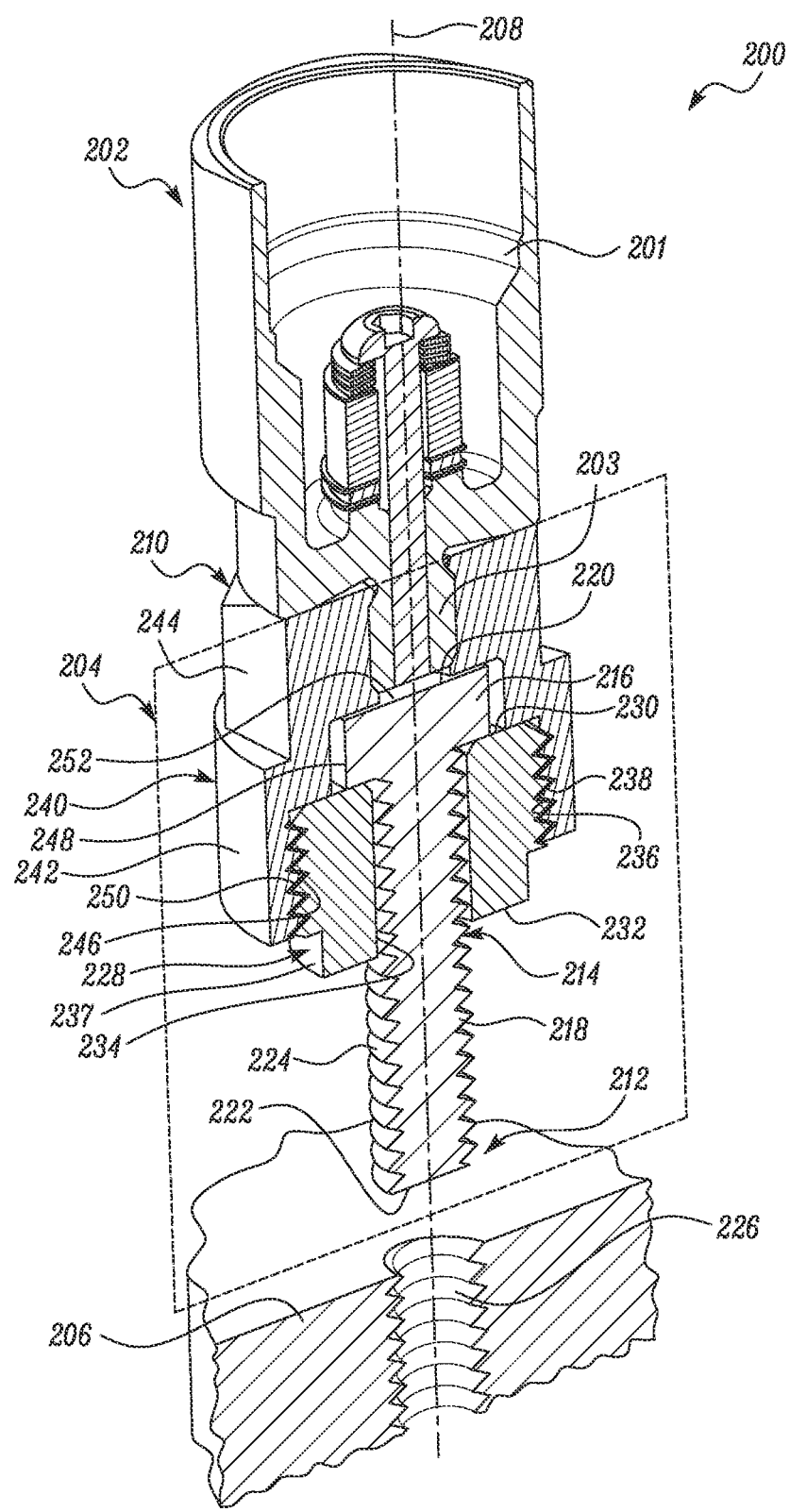

FIGS. 2 and 3 illustrate an exemplary vibration measurement system 200 configured to be retrofitted onto a machine component of the machine 100 for measuring vibrations in that machine component. In an exemplary embodiment, the vibration measurement system 200 includes a vibration sensor 202 and a mounting system 204 for retrofitting the vibration sensor 202 on to a machine component, such as a machine component 206. As explained previously, the machine component 206 may be any rotating component of the machine 100, such as the engine 128, the torque converter 130, the transmission 132, and so on of the drivetrain system 126 of the machine 100.

The vibration sensor 202 may be an accelerometer, that may be mounted near the rotating machine component 206. As illustrated, the vibration sensor 202 includes a sensor housing 201 for housing one or more sensing elements and a mounting section 203 for facilitating mounting of the vibration sensor 202. In an exemplary implementation, the mounting section 203 is an elongated section extending longitudinally downwards from the sensor housing 201. However, it may be contemplated that the structure of the sensor housing 201 and the mounting section 203 is merely exemplary and may be varied to achieve similar results without deviating from the scope of the claimed subject matter. The signals or sensor data generated by the vibration sensor 202 may be utilized by a controller (not shown) associated with the machine 100 to identify wear or failure of the machine component 206. The controller may also utilize other information from other on-board sensors to monitor the condition of the machine component 206.

The mounting system 204 facilitates retrofitting the vibration sensor 202 onto the machine component 206 without requiring welding, drilling, or tapping the existing machine component 206. As will be understood by a person ordinarily skilled in the art, that any machine component includes a number of fastening bolts that are usually fastened into a fastening receptacle on the machine component. The mounting system 204 utilizes these existing fastening receptacles formed on the machine components to retrofit the vibration sensor 202. The details of how the vibration sensor 202 is retrofitted onto the machine component 206 will not be described in greater details.

The mounting system 204 defines a longitudinal axis 208 and includes a first longitudinal end 210 (also referred to as a top end 210) and a second longitudinal end 212. The mounting system 204 includes an elongate fastener 214 disposed along the longitudinal axis 208. The elongate fastener 214 includes a fastener head 216 and an elongated body 218. The elongate fastener 214 defines a longitudinal top end 220 and a longitudinal bottom end 222 that also defines the second longitudinal end 212 of the mounting system 204. In an example, the elongate fastener 214 may include threads 224 (shown in FIG. 3) configured to facilitate fastening of the elongate fastener 214 into a complimentary fastening receptacle 226 formed on the machine component 206 of the machine 100. In one example, the threads 224 may extend along the entire elongated body 218 of the elongate fastener 214. Alternatively, the threads 224 may be formed only near the longitudinal bottom end 222 to define a fastening or threaded end of the elongate fastener 214. As explained previously, the fastening receptacle 226 may be an already existing threaded receptacle formed on the machine component 206. Therefore, in an exemplary embodiment, the elongate fastener 214 may be a threaded bolt similar to a threaded bolt that was originally fastened into the fastening receptacle 226 of the machine component 206. In one example, the elongate fastener 214 may be longer in length than the threaded bolt originally fastened into the fastening receptacle 226 of the machine component 206, however, have the same threaded profile, as that of the original bolt, to be appropriately fastened into the receptacle 226 of the machine component 206. In the illustrated embodiment, the elongate fastener 214 is a M27 threaded bolt having 1 millimeter (mm) threads on a 27 mm diameter of the elongated body 218.

In an embodiment of the present disclosure, the mounting system 204 includes a washer 228 having a first longitudinal end 230 and a second longitudinal end 232 defining a height H1 of the washer 228. The washer 228 includes a central cavity 234 extending through the height H1 of the washer 228. The central cavity 234 is configured to receive and engage the elongated body 218 of the elongate fastener 214 therein. In an exemplary embodiment, the central cavity 234 of the washer 228 is configured to engage only a portion of the elongated body 218 near the fastener head 216 such that the fastener head 216 rests or abuts against the first longitudinal end 230 of the washer 228 to engage the elongate fastener 214 within the washer 228.

Further, in an exemplary embodiment of the present disclosure, the washer 228 defines an external surface 236 having threads 238 formed thereon, hereinafter referred to as the threaded external surface 236 of the washer 228. Although, the external surface 236 of the washer 228 is described to be threaded, it may be contemplated that any other form of fasteners may also be implemented on the external surface 236 to achieve similar results without deviating from the scope of the claimed subject matter. In a further embodiment of the present disclosure, the washer 228 may additionally include a flat section 237 extending longitudinally downward from the externally threaded surface 236 along the axis 208. The flat section 237 is configured to rest against the machine component 206 and prevent the washer 228 from rotating during operation. For instance, the flat section 237 facilitates an operator to prevent the rotation of the washer 228 with a wrench.

The mounting system 204 further includes a mounting boss 240 coupled to the washer 228. The mounting boss 240 defines a first portion 242 and a second portion 244 extending longitudinally above the first portion 242 along the longitudinal axis 208 of the mounting system 204. The first portion 242 and the second portion 244 are formed such that they form a stepped structure, as shown in FIGS. 2 and 3. In an exemplary implementation, the second portion 244 has an outer diameter D that is less than an outer diameter D' of the first portion 242.

The first portion 242 further defines an internal cavity that includes a first cavity section 246 and a second cavity section 248. As illustrated, the first cavity section 246 has an inner diameter D1 that may be greater than the inner diameter D2 of the second cavity section 248, thereby forming an internally stepped profile. The first cavity section 246 is configured to engage with the external surface 236 of the washer 228 and the second cavity section 248 is configured to receive the fastener head 216 of the elongate fastener 214 therein. In an embodiment of the present disclosure, the first cavity section 246 includes an internal threaded surface 250 configured to engage with the externally threaded surface 236 of the washer 228, thereby fastening the mounting boss 240 together with the washer 228 and the elongate fastener 214.

Further, a height H2 of the first cavity section 246 is less than or equal to the height H1 of the washer 228. The height H3 of the second cavity section 248 is greater than or equal to a height H4 of the fastener head 216. In an exemplary implementation, an internal profile of the second cavity section 248 is configured to be complimentary to an external profile of the fastener head 216, such that the fastener head 216 is tightly fitted into the second cavity section 248 when the mounting boss 240 is fastened with the washer 228. Furthermore, in some implementations, the second portion 244 of the mounting boss 240 includes an outer profile similar to an outer profile of the fastener head 216 of the elongate fastener 214. In the illustrated example, the second portion 244 of the mounting boss 240 includes a hexagonal external profile. However, other design parameters for profiling the mounting boss 240 may also be contemplated to achieve similar results.

In an exemplary embodiment of the present disclosure, the second portion 244 further defines a receiving port 252 for receiving the vibration sensor 202 therein. In an example, the receiving port 252 is formed in the center of the mounting boss 240, such that it extends from the top end or the first longitudinal end 210 of the mounting system 204 into the second cavity section 248 of the first portion 242 of the mounting boss 240. As illustrated, the receiving port 252 is an elongated cavity extending along the longitudinal axis 208. In an exemplary implementation, the receiving port 252 defines an internal profile complimentary to a profile of the mounting section 203 of the vibration sensor 202, such that the vibration sensor 202 is tightly received into the receiving port 252. As illustrated, the mounting section 203 of the vibration sensor 202 is configured to rest on the fastener head 216 when received into the receiving port 252. In one example, the mounting section 203 of the vibration sensor 202 may be snap fitted into the receiving port 252. In other implementations, other techniques for fastening the vibration sensor 202 into the receiving port 252, such as threaded fastening, may also be used to achieve similar results without deviating from the scope of the claimed subject matter. Further, although the receiving port 252 is shown and described to be formed to receive and position the vibration sensor 202 along the longitudinal axis 208, it may be contemplated that in some alternative embodiments, the receiving port 252 may be formed on a side of the second portion 244 so as to receive and position the vibration sensor 202 on a side of the mounting system 204 for clearance in certain implementations.

INDUSTRIAL APPLICABILITY

The mounting system 204 of the present disclosure facilitates retrofitting of the vibration sensor 202 onto any machine component 206 that includes an existing fastener receptacle. The elongate fastener 214 is a longer version of the same bolt that was originally fastened into the fastener receptacle, such that the mounting system 204 (including the elongate fastener 214, the washer 228, the mounting boss 240) having the vibration sensor 202 can be easily fastened into the fastening receptacle to replace the original bolt. Additionally, positioning the vibration sensor 202 along the longitudinal axis 208 (i.e., directly on top of the fastener head 216) facilitates effective implementations even in low clearance applications. Nevertheless, in certain other implementations, the vibration sensor 202 may also be positioned on a side of the mounting system 204 to achieve similar results.

Further, the mounting system 204, i.e., the washer 228, the mounting boss 240 and the elongate fastener 214 are made up of steel to obtain a rigid mounting system 204 that also has a high natural frequency. In an exemplary implementation, the mounting system 204 is made up of AISI 4140 modified steel, that facilitates achieving natural frequency of the mounting system 204. The rigid structure and the natural frequency of the mounting system 204 make sure that vibration detection of the vibration sensor 202 truly represents the vibration from the internal mechanical components in the desired frequency range of interest as much as possible without major distortion from the mounting system 204 itself. Moreover, the outer profile of the mounting boss 240, more specifically, the second portion 244 of the mounting boss 240, is kept similar to a profile of fastener head so that existing tools can be used to fasten and unfasten the mounting system 204 from the fastening receptacle 226 of the machine component 206. Thus, the mounting system 204 provides for a convenient, cost effective, accurate and secure mounting technique for retrofitting the vibration sensor 202 to any machine component of the machine 100 without drilling, tapping, or welding.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A mounting system for retrofitting a vibration sensor to a machine component for measuring vibration in the machine component, the mounting system comprising:
    an elongate fastener having a fastener head and an elongated body defining a longitudinal top end and a longitudinal bottom end, the longitudinal bottom end defining a fastening end to engage with a corresponding fastening receptacle of the machine component;
    a washer defining an external surface and including a central cavity to engage the elongated body of the elongate fastener therein; and
    a mounting boss including:
        a first portion including an internal cavity, the first portion having:
            a first cavity section to engage with the external surface of the washer, and
            a second cavity section completely circumscribing the fastener head of the elongate fastener and to engage with the fastener head of the elongate fastener; and
        a second portion defining a receiving port to receive the vibration sensor therein.

2. The mounting system of claim 1, wherein the longitudinal bottom end of the elongate fastener includes a threaded fastener configured to engage with a corresponding threaded receptacle of the machine component.

3. The mounting system of claim 1,
    wherein the washer defines a first longitudinal end and a second longitudinal end defining a height of the washer, the central cavity extending through the height of the washer, and
    wherein the first longitudinal end of the washer is configured to abut the fastener head when the longitudinal top end of the elongated body of the elongate fastener is engaged within the central cavity.

4. The mounting system of claim 1,
    wherein the external surface of the washer is a threaded surface, and
    wherein the first cavity section of the internal cavity of the first portion of the mounting boss includes a threaded internal surface to engage with the external threaded surface of the washer.

5. The mounting system of claim 1, wherein the first cavity section of the internal cavity of the first portion of the mounting boss has an inner diameter greater than an inner diameter of the second cavity section of the internal cavity of the first portion of the mounting boss.

6. The mounting system of claim 1,
    wherein a height of the first cavity section of the internal cavity of the first portion of the mounting boss is equal to or less than a height of the washer, and
    wherein a height of the second cavity section of the internal cavity of the first portion of the mounting boss is equal to or greater than a height of the fastener head of the elongate fastener.

7. The mounting system of claim 1, wherein the second portion of the mounting boss defines an outer profile corresponding to an outer profile of the fastener head of the elongate fastener.

8. The mounting system of claim 1,
    wherein the mounting system defines a longitudinal axis and a top end, and
    wherein the receiving port of the second portion of the mounting boss extends longitudinally downward from the top end along the longitudinal axis into the second cavity section of the internal cavity of the first portion of the mounting boss.

9. The mounting system of claim 1,
    wherein the washer and the mounting boss are formed using steel, and
    wherein the mounting boss is to contact the longitudinal top end of the elongated body of the elongate fastener.

10. A vibration measurement system retrofittable to a machine component, the machine component having at least one threaded receptacle thereon, the vibration measurement system comprising:
    a vibration sensor to measure vibrations in the machine component; and
    a mounting system to mount the vibration sensor, the mounting system defining a longitudinal axis and including:
        an elongate fastener along the longitudinal axis of the mounting system, the elongate fastener having a fastener head and an elongated body defining a longitudinal top end and a longitudinal bottom end, the longitudinal bottom end defining a threaded end to engage with the threaded receptacle of the machine component;
        a washer defining a threaded external surface and including a central cavity to engage the elongated body of the elongate fastener therein; and
        a mounting boss including:
            a first portion including an internal cavity, the first portion having:
                a first cavity section to engage with the threaded external surface of the washer, and
                a second cavity section to engage with the fastener head of the elongate fastener; and
            a second portion defining a receiving port to receive the vibration sensor therein,
        wherein the receiving port is on an upper surface of the mounting boss, the upper surface of the mounting boss abutting the vibration sensor when the vibration sensor is received in the receiving port.

11. The vibration measurement system of claim 10,
    wherein the washer defines a first longitudinal end and a second longitudinal end defining a height of the washer, the central cavity extending through the height of the washer, and
    wherein the first longitudinal end of the washer is configured to abut the fastener head when the longitudinal top end of the elongated body of the elongate fastener is engaged within the central cavity.

12. The vibration measurement system of claim 10, wherein the first cavity section of the internal cavity of the first portion of the mounting boss has an inner diameter greater than an inner diameter of the second cavity section of the internal cavity of the first portion of the mounting boss.

13. The vibration measurement system of claim 10,
wherein a height of the first cavity section of the internal cavity of the first portion of the mounting boss is equal to or less than a height of the washer, and
wherein a height of the second cavity section of the internal cavity of the first portion of the mounting boss is equal to or greater than a height of the fastener head of the elongate fastener.

14. The vibration measurement system of claim 10, wherein the second portion of the mounting boss defines an external surface having an outer profile corresponding to an outer profile of the fastener head of the elongate fastener.

15. The vibration measurement system of claim 10,
wherein the mounting system defines a top end, and
wherein the receiving port of the second portion of the mounting boss extends longitudinally downward from the top end along the longitudinal axis into the second cavity section of the internal cavity of the first portion of the mounting boss.

16. The vibration measurement system of claim 15, wherein the vibration sensor includes a mounting section having a profile complimentary to an internal profile of the receiving port of the second portion of the mounting boss.

17. The vibration measurement system of claim 16, wherein the mounting section of the vibration sensor is configured to rest on the fastener head of the elongate fastener when the vibration sensor is received within the receiving port of the second portion of the mounting boss.

18. The vibration measurement system of claim 10,
wherein the washer and the mounting boss are formed using steel, and
wherein the mounting boss is to contact the longitudinal top end of the elongated body of the elongate fastener.

19. A machine comprising:
a plurality of machine components configured to vibrate during operation, each of the plurality of machine components including at least one threaded receptacle; and
a plurality of the vibration measurement systems of claim 10,
wherein each of the plurality of vibration measurement systems is retrofitted onto the corresponding one of the plurality of machine components by fastening the threaded bottom end of the elongate fastener into the corresponding threaded receptacle of the machine component.

20. A mounting system for retrofitting a vibration sensor to a machine component for measuring vibration in the machine component, the mounting system comprising:
an elongate fastener having a fastener head and an elongated body defining a longitudinal top end and a longitudinal bottom end, the longitudinal bottom end defining a fastening end to engage with a corresponding fastening receptacle of the machine component;
a washer defining an external surface and including a central cavity to engage the elongated body of the elongate fastener therein; and
a mounting boss including:
a first portion including an internal cavity, the first portion having:
a first cavity section to engage with the external surface of the washer, and
a second cavity section completely circumscribing the fastener head of the elongate fastener and to engage with the fastener head of the elongate fastener; and
a second portion defining a receiving port to receive the vibration sensor therein,
wherein one or more of the following conditions (i)-(iii) are satisfied:
(i) a height of the first cavity section of the internal cavity of the first portion of the mounting boss is equal to or less than a height of the washer, and a height of the second cavity section of the internal cavity of the first portion of the mounting boss is equal to or greater than a height of the fastener head of the elongate fastener,
(ii) the second portion of the mounting boss defines an outer profile corresponding to an outer profile of the fastener head of the elongate fastener, and
(iii) the mounting system defines a longitudinal axis and a top end, and the receiving port of the second portion of the mounting boss extends longitudinally downward from the top end along the longitudinal axis into the second cavity section of the internal cavity of the first portion of the mounting boss.

* * * * *